United States Patent
Bergmanis et al.

[15] 3,671,857
[45] June 20, 1972

[54] DEVICE FOR MEASURING PERMITTIVITY OF MATERIALS

[72] Inventors: Karlis Alfredovich Bergmanis, ulitsa Graudu, 15, kv. 1; Erik Ernestovich Klotinsh, ulitsa Tvaika, 54, korpus 4, kv. 19; Imant Gustovich Matis, ulitsa Laimdotas, 61, kv. 19, all of Riga, U.S.S.R.

[22] Filed: April 29, 1970

[21] Appl. No.: 32,823

[52] U.S. Cl. ......................................................324/61 QS
[51] Int. Cl............................................................G01r 27/26
[58] Field of Search ................................................324/61 TI

[56] References Cited

UNITED STATES PATENTS 3,400,331    9/1968    Harris..................................324/61 TI

*Primary Examiner*—Alfred E. Smith
*Attorney*—Holman & Stern

[57] ABSTRACT

A device for measuring permittivity of materials on the basis of at least two different capacitance values of a measuring capacitor connected to the material being tested and to a measuring oscillator the output of which is coupled to one input of a mixer whose other input is coupled to a reference oscillator and whose output is coupled through a frequency meter to a resetting unit, characterized in that the measuring capacitor has at least two main electrodes permanently connected to the input of the measuring electrodes permanently connected to the input of the measuring oscillator, and one additional electrode alternately connected by a switch to one of the main electrodes in the course of measurement, while said resetting unit is connected to a pulse counter of the frequency meter through a switch actuated synchronously with said switch of the measuring capacitor electrodes so that in one position of this switch the frequency of the measuring oscillator is above, and in the other position of the switch, below the frequency of the reference oscillator.

1 Claim, 1 Drawing Figure

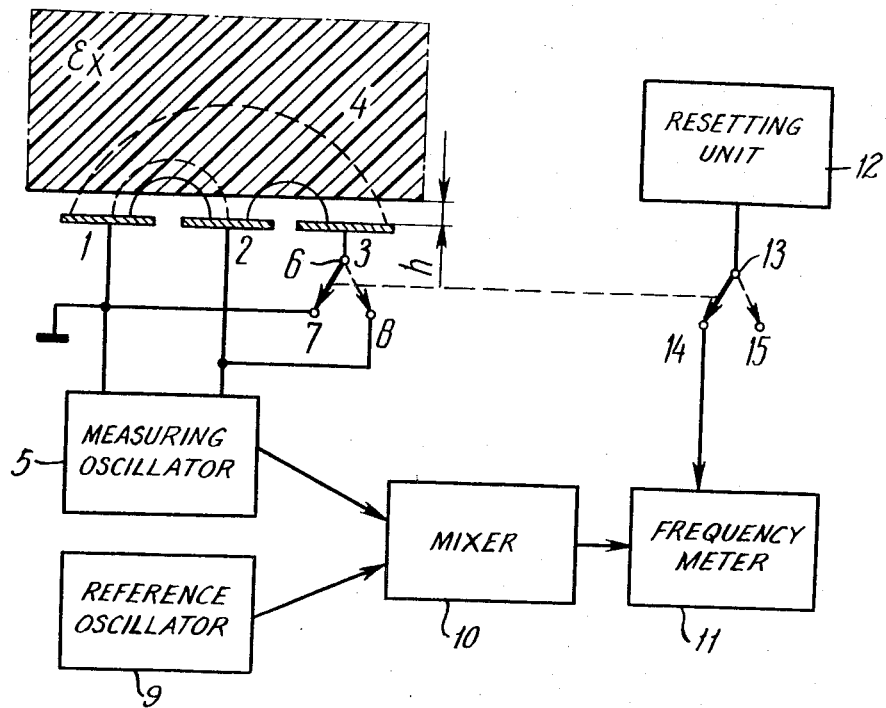

DEVICE FOR MEASURING PERMITTIVITY OF MATERIALS

The present invention relates to electric measurement techniques and more particularly to devices for measuring permittivity of various materials accessible from one side.

There exists a device for measuring permittivity of materials accessible from one side. This device comprises a measuring capacitor formed by several electrodes applied to the surface of the material being tested and permanently connected to the tubed circuit of a measuring oscillator. The permittivity of the tested material determines the capacitance of the measuring capacitor which, in its turn, determines the frequency of the measuring oscillator. The following set-up is used for precise measurement of this frequency.

The device uses a reference oscillator furnishing a constant frequency which is below the frequency of the measuring oscillator over the entire measurement range. The outputs of the measuring and reference oscillators are coupled to the input of a mixer, the output of the latter being connected to a frequency meter. Therefore at higher permittivity of the tested material the capacitance of the measuring capacitor increases and the frequency of the measuring oscillator decreases. However, owing to the fact that the frequency of the reference oscillator is below that of the measuring oscillator, at higher permittivity, the differential frequency appearing at the output of the mixer decreases, i.e., this differential frequency is inversely proportional to the permittivity. The differential frequency is measured by a frequency meter which is actually a series combination of a switch and a pulse counter. Such design of the frequency meter is due to the following reason. The existing device finds the permittivity from the difference in the capacitance values of the measuring capacitor when vacant and when filled with the tested material. As in both measurements the spurious capacitances of the measuring capacitor remain unchanged, their effect is cancelled out when the capacitances are subtracted. Subtraction of the capacitances is accomplished with the aid of a reversible pulse counter. The entire measurement cycle is made up of two operations:

I. Immediately before the measurement when the measuring capacitor is not yet filled with the tested material the reversible pulse counter is started for "addition" and stores a code proportional to the difference between the frequency $f_u$ of the measuring oscillator and the frequency $f_o$ of the reference oscillator:

$$N_1 = t_u(f_u - f_o) \quad (1)$$

where $t_u$ is the measurement time.

II. The measuring capacitor is filled with the tested material and the reversible counter is started again, this time for "subtraction," without resetting the previous reading. In this operation the frequency of the measuring oscillator will be smaller due to the effect of the permittivity of the tested material. Consequently, the following code will be subtracted from the previous reading:

$$N_2 = t_u(f_u - S \cdot \epsilon - f_o) \quad (2)$$

where $S$ is the sensitivity of the measuring oscillator to permittivity, $\epsilon$ is the permittivity of the tested material.

The code which results from the complete cycle (two operations) is equal to:

$$N = N_1 - N_2 = t_u(f_u - f_o - f_u + S \cdot \epsilon + f_o) = S \cdot \epsilon \cdot t_u \quad (3)$$

and is proportional to the permittivity.

A disadvantage of the existing device is that it has a low measuring accuracy due to the fundamental error inherent in the method of permittivity measurement using applicable electrodes, namely, the error caused by the absence of a tight contact between the electrodes of the measuring capacitor and the tested surface. The origin of this error lies in the fact that the electric field produced in the tested material by the measuring capacitor formed by applicable electrodes is highly non-uniform. This field has maximum sensitivity directly at the surface of the electrodes, so that even the tiniest air gaps between the electrodes and the tested surface or the irregularities of the latter cause large errors. The known device in which the electrodes are permanently connected to the measuring setup takes no account of this error.

With such coarse method of permittivity measurement the high accuracy of the pulse counter remains unutilized.

Another disadvantage of the known device is that one of the two operations comprising the measurement cycle has to be performed with the measuring capacitor not filled with the tested material, which fact complicates the repeated measurements or investigation of permittivity changes.

At the same time reversible pulse counters employed in the device impose certain limitations on, and complicate the design of permittivity-measuring equipment.

An object of the present invention is to obviate the above disadvantages.

A particular object of the present invention is to provide a device for measuring permittivity of materials which would make it possible to:

carry out measurements with a high accuracy;

simplify the repeated measurements and enable investigation of small permittivity changes, and simplify the measuring set-up so as to enable the use of any pulse counter regardless of its design and direction of counting.

With this object in view, the device for measuring permittivity of materials on the basis of at least two different capacitance values of a measuring capacitor coupled to the material being tested and connected to a measuring oscillator the output of which is coupled to the first input of a mixer whose second input is coupled to a reference oscillator and whose output is coupled to the input of a resetting unit through a frequency meter in the form of a series combination of a switch and a pulse counter is, according to the invention, so designed that the measuring capacitor has at least two main electrodes permanently connected to the input of the measuring oscillator and one additional electrode alternately connected by a switch to one of the main electrodes in the course of the measurement, while said resetting unit is connected to the pulse counter through a switch actuated synchronously with said switch of the measuring capacitor electrodes so that in one position of this switch the frequency of the measuring oscillator is above, and in the other position, below, the frequency of the reference oscillator.

The invention will be best understood from the following description of its specific embodiment when read in connection with the accompanying drawing, which is a block diagram of the device, according to the invention.

The device for measuring permittivity comprises a measuring capacitor formed by main electrodes 1 and 2 and an additional electrode 3 which are applied to a material 4 being tested. The main electrodes 1 and 2 are permanently connected to a measuring oscillator 5 and the additional electrode 3 is connected by a switch 6 to the main electrode 1, when the switch is in the position 7, and to the main electrode 2, when the switch is in the position 8. The outputs of the measuring oscillator 5 and reference oscillator 9 are coupled to the input of a mixer 10, the output of which is coupled to the input of a frequency meter 11.

A resetting unit 12 is connected to the frequency meter 11 through a switch 13 actuated synchronously with the switch 6. In the position 14 of the switch 13 the resetting unit 12 is connected to the frequency meter 11, while in the position 15 the resetting unit is disconnected.

The device operates as follows.

The entire measurement cycle is made up of two operations. The electrodes 1, 2, 3 are applied to the material 4.

I. When the switch 6 is set to the position 7, the additional electrode 3 is connected to the main electrode 1. An electric field is produced in the tested material and its lines of force link the electrodes 2, 1 and 2, 3 as shown by a solid line in FIG. 1. In this case, to a first approximation the capacitance connected in the tuned circuit of the measuring oscillator 5 can be written in the form:

$$C_1 = C_{01} + \frac{\partial C_1}{\partial \epsilon}\bigg|_{\epsilon=1}(\epsilon-1) + \frac{\partial C_1}{\partial h}\bigg|_{h=0} h \quad (5)$$

wherein
- $C_{01}$ is the capacitance value of the measuring capacitor in the absence of the tested material, with the switch 6 set to the position 7,
- $\epsilon$ is the relative permittivity of the material 4,
- $h$ is the air gap between the electrodes 1, 2, 3 and the tested material 4.

The second and third terms of the equation represent variation of the capacitance $C_1$ depending on the variation of the permittivity $\epsilon$ and the size $h$ of the gap (sensitivity of the measuring capacitor to the permittivity $\epsilon$ and air gap $h$).

The frequency of the measuring oscillator 5 corresponding to this case is given by an analogous equation:

$$f_1 = f_{01} + \frac{\partial f_1}{\partial \epsilon}\bigg|_{\epsilon=1}(\epsilon-1) + \frac{\partial f_2}{\partial h}\bigg|_{h=0} h \quad (6)$$

where
- $f_{01}$ is the frequency of the measuring oscillator 5 in the absence of the tested material, with the switch 6 set to the position 7.

The frequency of the reference oscillator 9 must be either above the frequency $f_1$ or below this frequency over the entire permittivity measurement range $\epsilon$.

Suppose the frequency of the reference oscillator 9 equal to $f_o$ is below the frequency $f_1$ over the entire permittivity measurement range $\epsilon$, and the differential frequency of the two oscillators appearing at the output of the mixer 10 is measured by the frequency meter 11. In the device described herein the frequency meter may use a series combination of a switch and a pulse counter regardless of the construction and direction of counting of the latter. Assume that an adding counter is employed. As the switch 13 operates synchronously with the switch 6 in the case under discussion the switch 13 is in the position 14 in which the resetting unit 12 is connected to the frequency meter 11. This means that before the frequency meter 11 is started the previous reading of the meter is reset and, upon starting, the frequency meter stores the code corresponding to:

$$N_1 = t_u(f_1 - f_0) = t_u\left[f_{01} + \frac{\partial f_1}{\partial \epsilon}\bigg|_{\epsilon=1}(\epsilon-1) + \frac{\partial f_1}{\partial h}\bigg|_{h=0} h - f_0\right] \quad (7)$$

This ends the first operation of the measurement cycle.

II. The switch 6 is operated to the position 8 in which the additional electrode 3 is connected to the main electrode 2. An electric field is produced in the tested material and its lines of force link the electrodes 1, 2 and 1, 3 as shown by a dotted line in FIG. 1. In this case, to a first approximation the capacitance connected in the tuned circuit of the oscillator can be written as follows:

$$C_2 = C_{02} + \frac{\partial C_2}{\partial \epsilon}\bigg|_{\epsilon=1}(\epsilon-1) + \frac{\partial C_2}{\partial h}\bigg|_{h=0} h \quad (8)$$

where
- $C_{02}$ is the capacitance value of the measuring capacitor in the absence of the tested material 4, with the switch 6 set to the position 8.

Accordingly the frequency of the measuring oscillator 5 in the second operation is given by the equation:

$$f_2 = f_{02} + \frac{\partial f_2}{\partial \epsilon}\bigg|_{\epsilon=1}(\epsilon-1) + \frac{\partial f_2}{\partial h}\bigg|_{h=0} h \quad (9)$$

where $f_{02}$ is the frequency of the measuring oscillator 5 in the absence of the tested material, with the switch 6 set to the position 8.
The frequency $f_{02}$ is selected so that the frequency of the measuring oscillator should remain below the frequency of the reference oscillator 9 over the entire range $\epsilon$ of permittivity measurement. During this operation the switch 13 operating synchronously with the switch 6 is in the position 15 and the resetting unit 12 is disconnected from the frequency meter 11. When the counter is started without resetting the previous reading the following code is added:

$$N_2 = t_u(f_0 - f_2) = t_u\left[f_0 - f_{02} - \frac{\partial f_2}{\partial \epsilon}\bigg|_{\epsilon=1}(\epsilon-1) - \frac{\partial f_2}{\partial h}\bigg|_{h=0} h\right] \quad (10)$$

This ends the second operation of the measurement cycle.

The resulting code after the performance of the two operations is equal to the sum of the codes $N_1$ and $N_2$:

$$N = N_1 + N_2 = t_u\bigg[f_{01} + \frac{\partial f_1}{\partial \epsilon}\bigg|_{\epsilon=1}(\epsilon-1) + \frac{\partial f_1}{\partial h}\bigg|_{h=0} h$$
$$- f_0 + f_2 - f_{02} - \frac{\partial f_2}{\partial \epsilon}\bigg|_{\epsilon=1}(\epsilon-1) - \frac{\partial f_2}{\partial h}\bigg|_{h=0} h\bigg] \quad (11)$$

In order to eliminate the effect of the air gap between the electrodes of the measuring capacitor and the surface of the tested material the measuring oscillator 5 must have the equal sensitivity to the air gap $h$ in both positions of the switch 6, i.e.:

$$\frac{\partial f_1}{\partial h} = \frac{\partial f_2}{\partial h} \quad (12)$$

Considering the condition (12) we obtain the resulting code which is equal to:

$$N = t_u\left[(f_{01} - f_{02}) + \left(\frac{\partial f_1}{\partial \epsilon}\bigg|_{\epsilon=1} - \frac{\partial f_2}{\partial \epsilon}\bigg|_{\epsilon=1}\right)(\epsilon-1)\right] \quad (13)$$

It should be stressed here that as shown by the equation (13) the resulting code does not contain the component of the air gap $h$. Moreover, owing to the fact that the resulting code is obtained by subtracting the two measured capacitance values of the measuring capacitor, the effects of the spurious capacitances and of the frequency drift of the oscillator 5 outside the measurements cycle are cancelled out in the final measurement result. This can be easily seen by substituting the drift component into the equations 6 and 9 in which it has a similar sign. Because of the subtraction of signals in the resulting code 11 the drift component has the opposite sign and is thus eliminated from the measurement result.

Now the measurement result must be represented in the digital code indicative of permittivity. In the equation 13 the first addend in the brackets gives the frequency-meter reading when the measurement is made in the absence of the tested material, i.e., when measuring the permittivity of the air and $\epsilon = 1$. The multiplier of the second addend in the brackets in the equation:

$$\frac{\partial t_1}{\partial \epsilon}\bigg|_{\epsilon=1} - \frac{\partial t_2}{\partial \epsilon}\bigg|_{\epsilon=1}$$

represents the difference in the sensitivity of the measuring oscillator 5 to permittivity in the two positions of the switch 6. The following two conditions must be observed to obtain the direct digital reading:

$$t_u(f_{01} - f_{02}) = 10^n; t_u\left(\frac{\partial f_1}{\partial \epsilon}\bigg|_{\epsilon=1} - \frac{\partial f_1}{\partial \epsilon}\bigg|_{\epsilon=1}\right) = 10^n \quad (14)$$

$n$ is the number of digits of the counter.

Considering the conditions the expression for the resulting code takes the form:

$$N = 10^n + 10^n(\epsilon - 1) = 10^n \cdot \epsilon \quad (15)$$

The equation (15) shows that the measurement result is given directly in the digital code indicative of permittivity and is unaffected by the air gap between the electrodes of the capacitor and the surface of the tested material.

Certain modifications of the device and the additional possibilities it offers merit special attention.

In the example discussed above it was assumed that during the first operation the frequency of the measuring oscillator 5 is above, and during the second operation, below that of the reference oscillator 9 over the entire measurement range.

However, an opposite case is possible, when during the first operation the frequency of the measuring oscillator 5 is below, and during the second operation above, the frequency of the reference oscillator 9. Besides, provision for switching these frequencies to satisfy the above conditions may be incorporated both in the measuring oscillator 5 and in the reference oscillator 9.

It should be specially noted that the following modifications of the device described herein are possible. If in the resulting code equation the sensitivities of the measuring oscillator 5 to permittivity are made equal in both positions of the switch 6:

$$\left.\frac{\partial f_1}{\partial \epsilon}\right|_{\epsilon=1} = \left.\frac{\partial f_2}{\partial \epsilon}\right|_{\epsilon=1} \quad (16)$$

the device can be used for measuring the air gap between the electrodes and the tested material with elimination of the effect produced by the changes in its permittivity.

Furthermore, by modifying the construction of the measuring capacitor and, consequently, the corresponding initial equations and the sensitivity of the capacitor to the air gap in both positions of the switch 6 can be substituted with the sensitivity of the measuring capacitor to the thickness of the tested layer. This enables the device to be used for measuring the permittivity of the material with elimination of the effect produced by the changes in its thickness, or, conversely, for measuring the thickness of the material with elimination of the effect produced by the changes in its permittivity. Last but not least, the above examples in which the device was used for testing a solid dielectric do not preclude the use of the device with other types of dielectric: liquid, powdered, etc.

An advantage of the device described herein is that it offers the means for highly accurate non-destructive testing of ready articles which does not require special preparation (polishing) of the tested surface and gives the results in the digital form directly in units of permittivity.

What is claimed is:

1. A device for measuring permittivity of materials on the basis of at least two different capacitance values of a measuring capacitor connected to the material being tested and comprising at least two main electrodes and one additional electrode; a measuring oscillator the input of which is permanently connected to both of said main electrodes; a first switch which selectively connects said additional electrode to either one of said main electrodes in the course of measurement; a reference oscillator; a mixer the input of which is coupled to the outputs of both of said oscillators; a frequency meter, the input of which is coupled to the output of said mixer; a resetting unit; and a second switch connected to said first switch for simultaneous actuation therewith, said second switch connecting said resetting unit to said frequency meter in a first position thereof and disconnecting said resetting unit in the other position thereof, whereby in one position of said first and second switches the frequency of said measuring oscillator is above, and in the other position of said switches, below the frequency of said reference oscillator.

* * * * *